United States Patent [19]
Klyce

[11] 3,895,414
[45] July 22, 1975

[54] SAUSAGE CASING BREAKER
[75] Inventor: Thomas A. Klyce, Memphis, Tenn.
[73] Assignee: Ranger Tool Co., Inc., Ellendale, Tenn.
[22] Filed: Sept. 14, 1973
[21] Appl. No.: 397,394

[52] U.S. Cl. .................................................. 17/1 F
[51] Int. Cl. ...................................................... A22b
[58] Field of Search......................................... 17/1 F

[56] References Cited
UNITED STATES PATENTS
2,636,213  4/1953  Fedevich ............................... 17/1 F
2,670,498  3/1954  Mosby ................................... 17/1 F

*Primary Examiner*—Robert Peshock
*Attorney, Agent, or Firm*—John R. Walker, III

[57] ABSTRACT

For use in typical sausage casing peeling apparatus which utilizes vacuum applied to a peeling wheel to peel the casing from the sausage and vacuum applied to a discharge wheel to carry the meat-free casing to a discharge opening. The sausage casing breaker includes structure for establishing a ratio between the linear velocities at the circumferences of the peeling wheel and the discharge wheel with the linear velocity at the circumference of the discharge wheel exceeding the linear velocity at the circumference of the peeling wheel. Since the vacuum causes the meat-free casing to be firmly attached to these two wheels, tension of the casing develops as the two wheels are rotatably driven. The magnitude of the tension is sufficient to cause the casing to break intermittently at predetermined locations along the length of the casing. These broken fragments are considerably easier to handle than is the usual long continuous string of casing.

6 Claims, 3 Drawing Figures

SAUSAGE CASING BREAKER

BACKGROUND OF THE INVENTION

1. Field of the Invention

This invention relates to apparatus for peeling the casing from sausage or the like and is particularly directed toward apparatus for severing the casing into fragments.

2. Description of the Prior Art

The usual practice in apparatus for peeling the casing from sausages is to simply discharge the continuous string of meat-free casing into suitable receptacles. The casing is manually removed from the receptacle for further disposition and since the casing may be in lengths up to 90 feet long, it becomes tangled and very difficult to handle. Further, an attempt to convey these continuous strings of meat-free casing in a conventional manner, e.g., through an air conveyor duct, is not feasible since the casing has a tendency to cling to the wall of the air duct, particularly adjacent bends in the duct, thus precluding the movement therethrough.

In other words, the sausage processing facility has been thwarted in any attempt to modernize the antiquated and time-consuming task of moving the accumulated casings from the peeling apparatus to a remote location.

SUMMARY OF THE INVENTION

The present invention is directed towards overcoming the disadvantages and problems relative to previous sausage casing peeling apparatus, particularly the handling problem of the meat-free casings. The concept of the present invention is to provide structure which economically breaks the casing into fragments which are then easily handled. In other words, the casing fragments may be entrained in an air duct or air conveyor means when desired. On the other hand, the casing fragments are much easier to handle when doing so by hand. It will be appreciated by those skilled in the art that the air conveying means of the casing fragments is more feasible and improves the overall sanitation of the meat processing facility. However, this particular aspect is optional and not a part of the concepts herein disclosed.

The sausage casing breaker of the present invention is intended to be used with typical sausage casing peeling apparatus which utilizes vacuum that is applied to a peeling wheel to peel the casing from the sausage and vacuum that is applied to a discharge wheel to carry the meat-free casing to a discharge opening. The sausage casing breaker includes structure for establishing a ratio between the linear velocities at the circumferences of the peeling wheel and the discharge wheel with the linear velocity at the circumference of the discharge wheel exceeding the linear velocity at the circumference of the peeling wheel. Since the vacuum causes the meat-free casing to be firmly attached to these two wheels, tension of the casing develops as the two wheels are rotatably driven. The magnitude of the tension is sufficient to cause the casing to break intermittently at predetermined locations along the length of the casing, e.g., the casing fragments usually being approximately 10 inches long.

DESCRIPTION OF THE PREFERRED EMBODIMENT

Figure 1:
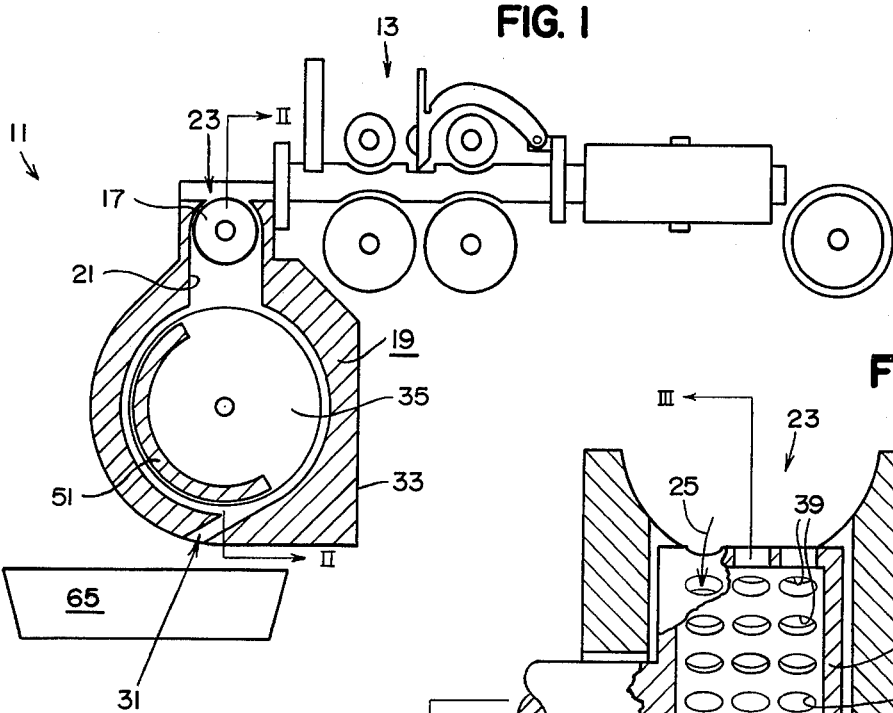
FIG. 1 is a partially sectioned view of the sausage casing breaker of the present invention with the cut being taken along the vertical center line thereof and with sausage casing peeling apparatus being diagrammatically depicted adjacent thereto.

The sausage casing breaker 11 of the present invention is intended for use in typical sausage casing peeling apparatus as at 13, which utilizes vacuum from a vacuum source, as at 15, that is applied to a peeling or stripping wheel 17 to peel casing from the sausage. An example of this type machine is fully disclosed in U.S. Pat. No. 3,312,995 in which a string of encased sausages is advanced lengthwise under a slitting knife. After the casings are slit longitudinally, they are partially separated from the internal meat body by air jets disposed thereabove to direct jets of air into the slits and between the casings. Complete removal of the casings is effected by a rotating stripping wheel which applies vacuum to the casings to engage them against its periphery while deflector means is provided in the path of the advancing sausage forward of the stripping wheel to accelerate the sausage away from the periphery of the wheel for effecting positive removal of the casing thus forming a continuous string of meat-free casing as the stripping wheel rotates.

Additionally, the sausage casing breaker of the present invention is an improvement on the invention disclosed in U.S. Pat. No. 3,608,973 assigned to the same assignee as the invention of this disclosure. The 3,608,973 patent is directed toward structure similar to the 3,312,995 patent and additionally discloses structure for moving the continuous string of meat-free casing to a position of no vacuum where the casing may be discharged at atmospheric pressure or collected in a receptacle which is positioned remote from the vacuum source.

The sausage casing breaker 11 of the present invention includes housing structure 19 defining an air chamber 21 which is communicated with the vacuum source 15 and has an intake opening, as at 23, for admitting inwardly rushing air. A plurality of arrows 25 are shown in FIGS. 2 and 3 to depict the inwardly rushing air and to show the optimum path the air travels through the air chamber 21 in ultimately reaching the vacuum source 15.

The casing breaker 11 also includes the abovementioned peeling wheel 17 which may also be referred to herein as a first perforated rotatably driven wheel. The peeling wheel 17 is hollow or drumlike in character and is conveniently rotatably mounted in housing structure 19 by suitable means so that succeeding segments of the circumference thereof are interposed within or adjacent to the intake opening 23 in substantially the same manner as disclosed in the abovementioned 3,608,973 patent, i.e., the wheel 17 is disposed within the chamber 21. In other words, the inward rushing air, as indicated by the arrows 25, peels the casing from the sausage, as at 27, as it is caused to pass adjacent the circumference of the peeling wheel 17, thus forming a continuous string of meat-free casing, as at 29, as the first wheel 17 rotates.

The housing structure 19 also is provided with a discharge opening 31 which leads outwardly to the exterior of the housing structure, as at 33, for passing the casing 29 outwardly therethrough in a manner which will be fully disclosed as the specification proceeds. The sausage casing breaker 11 also includes a second perforated rotatably driven vacuum or air evacuated wheel 35 for engaging the casing 29 as it becomes disengaged from the peeling wheel or first wheel 17 and for moving the casing 29 towards the discharge opening 31. The second wheel 35 being hollow but cuplike in character is rotatably mounted in housing structure 19 by suitable means and is conveniently disposed within the chamber 21 with succeeding segments of the wheel 35 being adjacent the discharge opening 31.

Figure 2:
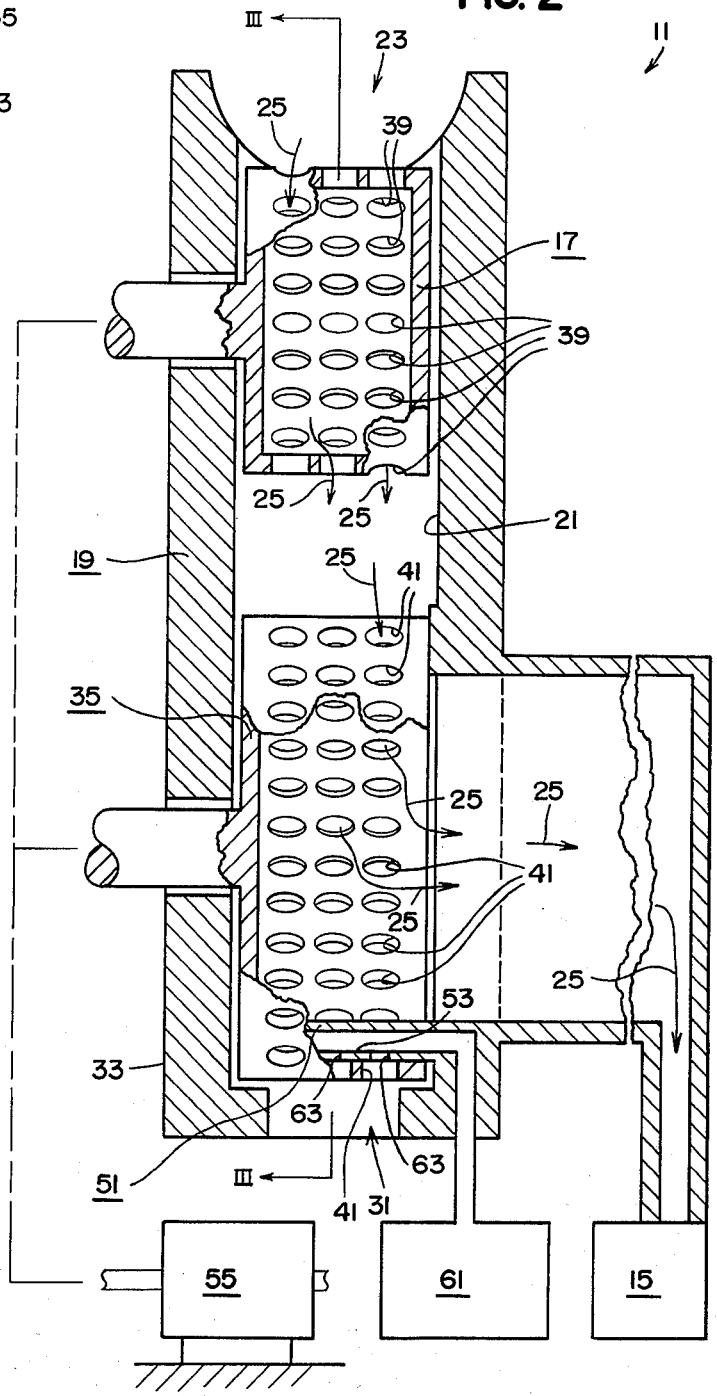
FIG. 2 is a sectional view taken as on the line II—II of FIG. 1.
Figure 3:
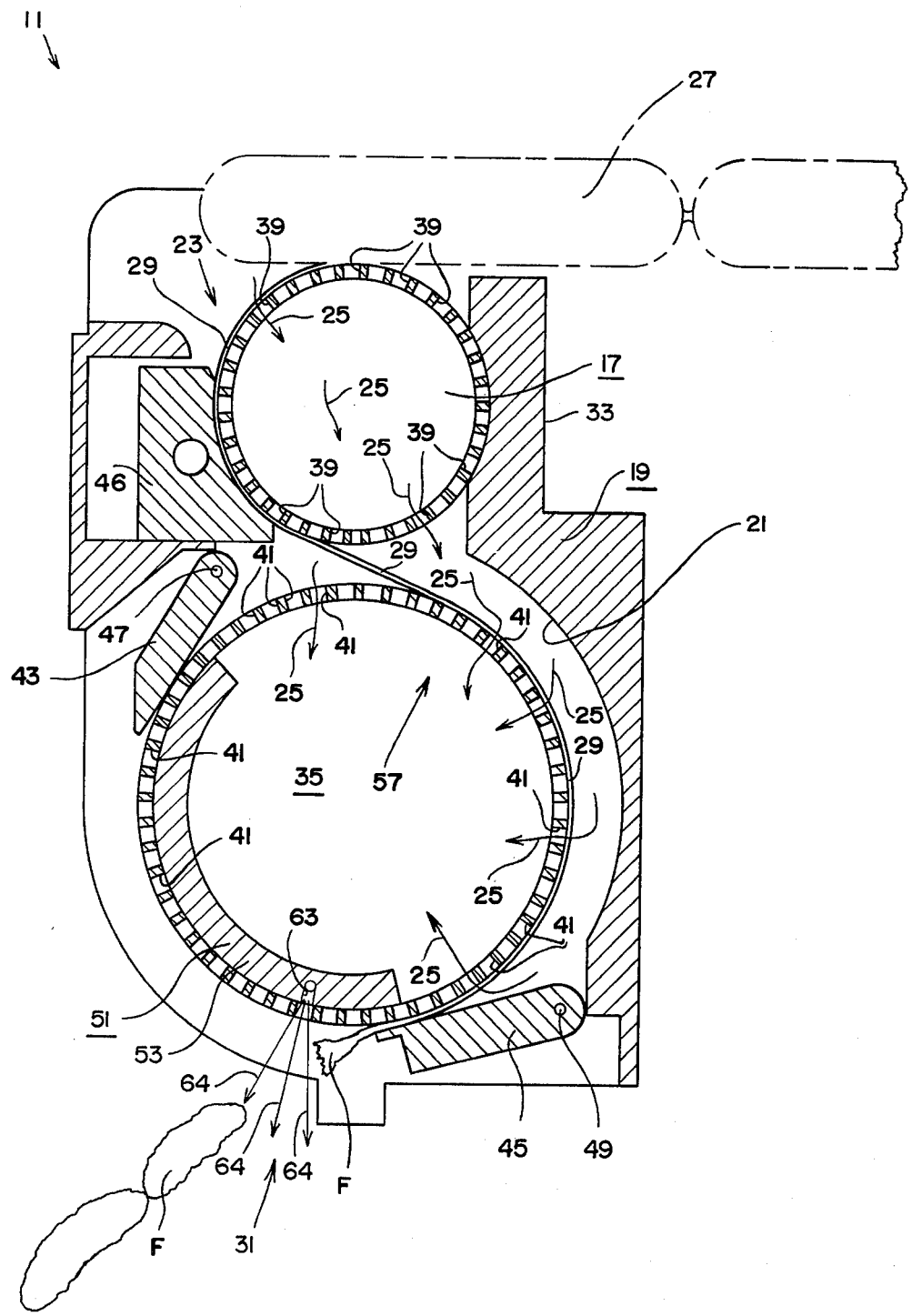
FIG. 3 is an enlarged sectional view taken as on the line III—III of FIG. 2.

From FIG. 2 of the drawings it may be seen that the circumference of the peeling wheel 17 is provided with a plurality of perforations 39 and the circumference of the second wheel 35 is provided with a plurality of perforations 41. The perforations 39, 41 allow passage of the air through the air chamber 21 substantially as depicted by the arrows 25. Accordingly, the casing 29 is drawn against the peeling wheel 17 when the appropriate perforations 39 are adjacent the intake opening 23 as clearly shown in FIG. 1 of the drawings. Additionally, the casing 29 is blown away from the perforations 39 as the perforations 39 move toward the 6 o'clock position as shown in FIG. 3. As the casing is blown away from the peeling wheel 17, as just described, it is being pulled toward the perforations 41 of the second wheel 35, i.e., when the perforations 41 are in the vicinity of the 12 o'clock position as depicted in FIG. 3.

The casing breaker 11 also includes an upper flap valve 43 and a lower flap valve 45 as clearly shown in FIG. 3 of the drawings. The flap valves 43, 45 are pivotally attached to the housing structure 19 at the respective pivot points 47, 49 and have the free swinging ends thereof yieldably urged toward the periphery of the wheel 35 in somewhat the same manner as the outside sealing or vacuum gate disclosed in the aforementioned 3,608,973 patent. In addition, casing breaker 11 preferably includes a shoe 46, which is preferably spring loaded by a spring, not shown, to apply pressure against the casing 29 and wheel 17 for insuring a better pick-up. Also, shoe 46 provides a vacuum seal, and is particularly useful when a knot is in the casing in which case the shoe 46 will retract to permit the knot to pass and then return to its normal position.

From FIGS. 1–3 of the drawings it may be seen that the casing breaker 11 also includes internal perforation blocking or seal means 51 conveniently arranged in the lower interior of the wheel 35 which is operative for including passage of inward rushing air through the perforations 41 adjacent thereto. The seal means 51 operates in somewhat the same manner as does the inside blocking or seal means character referenced by the numeral 59 and fully disclosed in the aforementioned 3,608,973 patent. Therefore, it should be sufficient to simply state that the seal means 51 includes a crescent-shaped projection 53 which is fixedly mounted from the housing structure 19 and which reaches into the cup-shaped interior of the wheel 35 as best viewed in FIG. 2 of the drawings. Accordingly, reference should be made to the 3,608,973 patent for a more detailed description of the structure and operating characteristics of the seal means 51.

From the above disclosure, it should be apparent that the discharge opening 31 of the air chamber 21 is isolated from the vacuum source 15, i.e., by the internal perforation blocking or seal means 51, to enable the casing 29 to readily become disengaged from the second wheel 35 and pass freely through the discharge opening 31 as the casing 29 passes adjacent to the discharge opening 31.

The casing breaker 11 includes means, such as a motor 55, for rotatably driving the first and second wheels 17, 35 with the first wheel 17 preferably being rotatably driven counterclockwise as viewed in FIGS. 1 and 3 and the second wheel 35 preferably being driven clockwise as when viewed in these same figures.

The casing breaker 11 of the present invention also includes disjoining means, as at 57, for severing the meat-free continuous string of casing 29 into fragments, which are characterized by the capital letter F, to facilitate further handling of the casing for the reason discussed earlier in the specification. The casing 29 is severed into fragments F as the casing 29 travels from the intake opening 23 towards the discharge opening 31, i.e., the severing is accomplished within the air chamber 21 in a manner to be fully disclosed later in the specification.

From FIG. 2 of the drawings it can readily be seen that the casing breaker 11 includes a high-pressure air source 61 which is communicated with a plurality of nozzles 63. The nozzles 63 are conveniently fitted to the crescent-shaped projection 53 so as to register with succeeding ones of the perforations 41 as the wheel 35 rotates. Therefore, the jet of air, as depicted by the arrows 64, emanates from the nozzles 63 and facilitates disengaging the casing fragments F from the wheel 35 as they pass through the discharge opening 31. More specifically, the fragments F are discharged by being sandwiched between the outer periphery of the wheel 35 and the free-swinging end of the lower flap valve 45, i.e., the lower flap valve 45 occluding the discharge opening 31 thus preventing air from being drawn into the air chamber 21 through the discharge opening 31.

The disjoining means 57 as herein disclosed includes structure which applies a predetermined degree of sustained tension upon the continuous string of meat-free casing 29 as the casing 29 engages the first and second wheels 17, 35. This tension is of such magnitude as to cause the casing 29 to break intermittently along the length thereof thus establishing the fragments F.

It will be appreciated by those skilled in the art that the sausage 27 usually is the well-known link sausage, e.g., the individual links being approximately 5 inches in length. Accordingly, the tension on the casing 29 usually causes the casing to break at the twist area connecting adjacent links. More specifically, since the diameter of the wheel 35 preferably is approximately 3 inches, the break usually occurs at every other connecting twist, thus resulting in the casing fragments F being approximately 10 inches in length, i.e., with respect to the above-mentioned dimensions which are to be considered as examples only.

The disjoining means 57 includes means for establishing a ratio between the linear velocities at the circumferences of the first and second wheels 17, 35 with the linear velocity at the circumference of the second wheel 35 exceeding the linear velocity at the circumference of the first wheel 17. It will be apparent to those skilled in the art that the ratio between the linear velocities at the circumferences of the first and second wheels 17, 35 may be established by rotating the wheels 17, 35 at different revolutions per minute. However, I prefer to establish a ratio between the linear velocities at the circumferences of the first and second wheels 17, 35 by establishing a ratio between the diameters of the first and second wheels 17, 35 and driving the wheels 17, 35 at substantially identical revolutions per minute.

More specifically, the second wheel 35 is larger in diameter than is the first wheel 17. Therefore, the second wheel 35 feeds more feet of casing 29 per unit of time than does the first wheel 17 while the first wheel 17 yieldably pays out less feet of casing per unit of time than what would normally move freely or not slip about the circumference of the second wheel 35. It should be understood that the vacuum pressure is conveniently adjusted to a predetermined level in a manner obvious to those skilled in the art so that the vacuum pressure applied to the first and second wheels 17, 35 is sufficient to allow a degree of slippage of the casing 29 about the second wheel 35. In this manner, tension is being applied to the casing 29 as the wheels 17, 35 are rotatably driven, i.e., preferably in opposite directions as above described.

The thusly established casing fragments F may simply gravitate from the discharge opening 31 and be collected in a receptacle 65 for further handling or the fragments F may be collected directly from the discharge opening 31 by suitable conveyor means, well known to those skilled in the art, e.g., an air duct (not shown), which conveniently moves the casing fragments F to a remote location. Obviously, the latter of the above two collecting methods is recommended to improve sanitation conditions of the environment adjacent the peeling apparatus 13.

Although the invention has been described and illustrated with respect to a preferred embodiment thereof, it is to be understood that it is not to be so limited since changes and modifications may be made therein which are within the full intended scope of the invention.

I claim:

1. The combination with apparatus for peeling a continuous string of casing from sausage and the like of casing breaker means, said casing breaker means comprising first means for engaging the continuous string of casing to peel the casing from the sausage, second means for engaging the continuous string of casing after the casing has been peeled from the sausage by said first means, and means for applying tension to the meat-free continuous string of casing between said first and second means to subsequently sever the meat-free continuous string of casing into casing fragments to facilitate further handling of the casing.

2. Apparatus for peeling casing from sausage and the like comprising a vacuum source, housing structure defining an air chamber communicated with said vacuum source and having an intake opening for admitting inwardly rushing air, a first perforated rotatably driven wheel having succeeding segments thereof interposed within said intake opening with the inward rushing air peeling the casing from the sausage as the sausage is caused to pass adjacent thereto thus forming a continuous string of meat-free casing as said first wheel rotates, said housing structure being provided with a discharge opening leading outwardly to the exterior of said housing for passing the casing outwardly therethrough, a second perforated rotatably driven air-evacuated wheel for engaging the casing as it becomes disengaged from said first wheel and moving it towards said discharge opening, said second wheel having succeeding segments thereof adjacent said discharge opening, said discharge opening being isolated from said vacuum source to enable the casing to readily become disengaged from said second wheel and pass freely through said discharge opening as the casing passes adjacent thereto, and disjoining means for severing the meat-free continuous string of casing into fragments to facilitate further handling of the casing, said disjoining means including means for applying tension to the meat-free continuous string of casing as the casing is being engaged with said first and second wheels to cause the casing to break intermittently along the length thereof thus establishing said fragments.

3. The apparatus of claim 2 in which said disjoining means are disposed within said air chamber being interposed between said intake opening and said discharge opening.

4. Apparatus for peeling casing from sausage and the like comprising a vacuum source, housing structure defining an air chamber communicated with said vacuum source and having an intake opening for admitting inwardly rushing air, a first perforated rotatably driven wheel having succeeding segments thereof interposed within said intake opening with the inward rushing air peeling the casing from the sausage as the sausage is caused to pass adjacent thereto thus forming a continuous string of meat-free casing as said first wheel rotates, said housing structure being provided with a discharge opening leading outwardly to the exterior of said housing for passing the casing outwardly therethrough, a second perforated rotatably driven air-evacuated wheel for engaging the casing as it becomes disengaged from said first wheel and moving it towards said discharge opening, said second wheel having succeeding segments thereof adjacent said discharge opening, said discharge opening being isolated from said vacuum source to enable the casing to readily become disengaged from said second wheel and pass freely through said discharge opening as the casing passes adjacent thereto, and disjoining means for severing the meat-free continuous string of casing into fragments to facilitate further handling of the casing, said disjoining means including means for establishing a ratio between the linear velocities at the circumferences of said first and second wheels with the linear velocity at the circumference of said second wheel exceeding the linear velocity at the circumference of said first wheel.

5. Apparatus for peeling casing from sausage and the like comprising a vacuum source, housing structure defining an air chamber communicated with said vacuum source and having an intake opening for admitting inwardly rushing air, a first perforated rotatably driven wheel having succeeding segments thereof interposed within said intake opening with the inward rushing air peeling the casing from the sausage as the sausage is caused to pass adjacent thereto thus forming a continuous string of meat-free casing as said first wheel rotates, said housing structure being provided with a discharge opening leading outwardly to the exterior of said housing for passing the casing outwardly therethrough, a second perforated rotatably driven air-evacuated wheel for engaging the casing as it becomes disengaged from said first wheel and moving it towards said discharge opening, said second wheel having succeeding segments thereof adjacent said discharge opening, said discharge opening being isolated from said vacuum source to enable the casing to readily become disengaged from said second wheel and pass freely through said discharge opening as the casing passes adjacent thereto, and disjoining means for severing the meat-free continuous string of casing into fragments to facilitate further handling of the casing, said disjoining means including means for establishing a ratio between the diameters of said first and second vacuum wheels with said second wheel being larger in diameter than said first wheel, rotatably driving said first and second wheels at predetermined speeds respectively with the linear velocity at the circumference of said second wheel being greater than that at the circumference of said first wheel, and a predetermined vacuum pressure being applied to said first and second vacuum wheels to allow a degree of slippage of the casing about said second wheel as tension is being applied to the casing, said tension being developed as said second wheel feeds more feet of casing per unit of time than does said first wheel while said first wheel yieldably pays out less feet of casing per unit of time than what would normally move freely about the circumference of said second wheel.

6. The apparatus of claim 5 in which said first and second wheels are rotatably driven in opposite directions one from the other.

* * * * *